Sept. 13, 1932. V. B. EAKIN 1,877,650
DRAFT EQUALIZER
Filed May 8, 1931 2 Sheets-Sheet 1
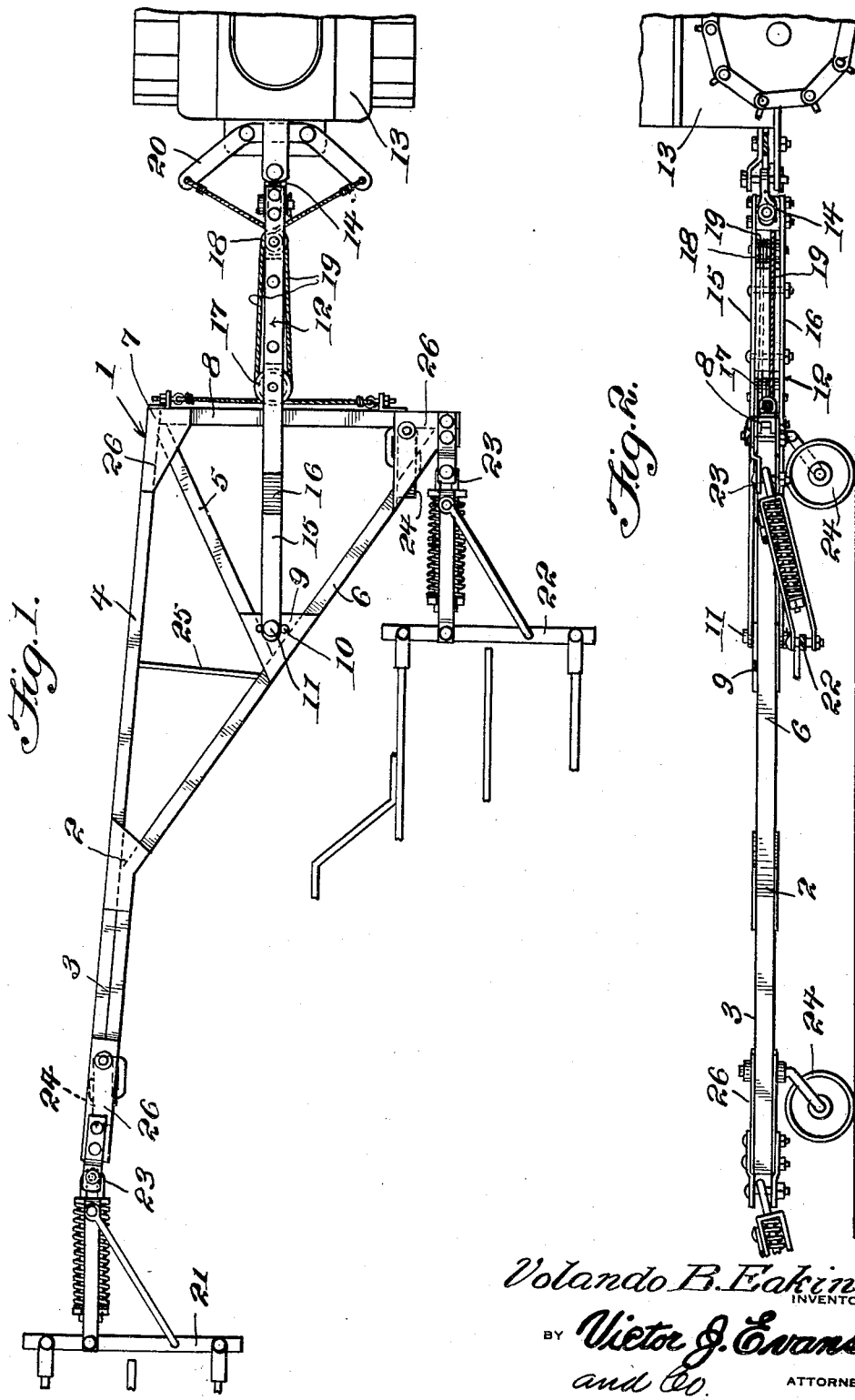
Volando B. Eakin
INVENTOR
BY Victor J. Evans
and Co.
ATTORNEYS Sept. 13, 1932.    V. B. EAKIN    1,877,650
DRAFT EQUALIZER
Filed May 8, 1931    2 Sheets-Sheet 2
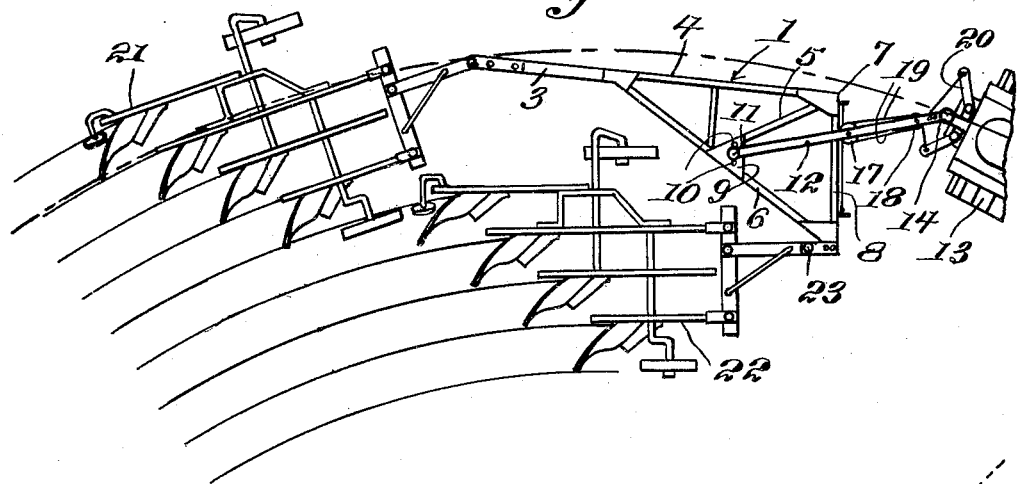
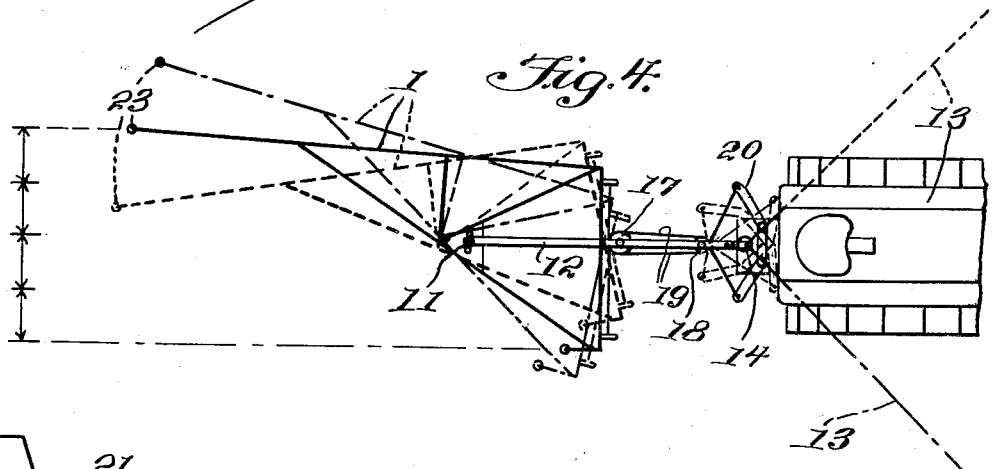
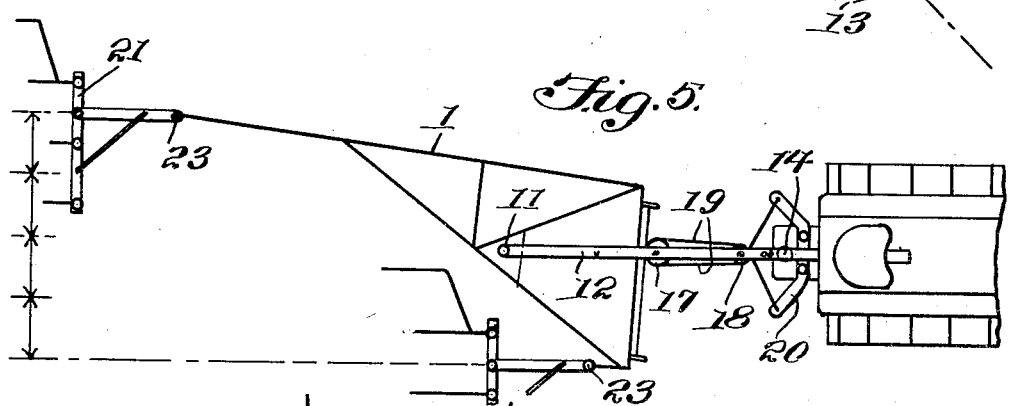

Patented Sept. 13, 1932

1,877,650

UNITED STATES PATENT OFFICE

VOLANDO B. EAKIN, OF GRASS VALLEY, OREGON

DRAFT EQUALIZER

Application filed May 8, 1931. Serial No. 536,016.

This invention relates to draft equalizers especially adapted for use between gang plows and their power medium and has for the primary object, the provision of a device of the above stated character which will place the draft from the power medium evenly between the gangs of plows and in an upwardly inclined direction between said plows and the power medium to cause the plows to properly follow the draft medium when either in the ground or while supported by their wheels and to maintain said plows at the proper plowing depth in the ground.

Another object of this invention is the provision of means to maintain the draft evenly distributed between the gangs of plows when travelling either in a straight course or when turning in either direction.

A further object of this invention is the provision of a plow attaching frame having a draft tongue between itself and the power medium and of such a construction that the gangs of plows when attached thereto will receive an even amount of draft and when plowing on a turn in either direction will maintain themselves in proper relative relation, so that the furrows formed by one gang of plows will not be entered into by the plows of the other gang nor will there be any ground unplowed between the furrows made by one gang of plows with those made by the other gang of plows.

A further object of this invention is the provision of the frame and its draft tongue so constructed that the gangs of plows may be moved in a reverse direction by the power medium when desiring to disengage any one of the plows from an obstruction or for removing foreign matter from the plows collected while plowing.

A further object of this invention is the provision of the frame of substantially triangular shape with the plows connected to the hypotenuse side of the triangle and said side supported by ground wheels and the draft tongue attached to the hypotenuse side intermediate the ends thereof and receiving therebetween the short side of the triangular frame so that when attached to the power medium, the corner between the right angle sides of the triangular frame is free to move upwardly and downwardly with the draft medium when travelling over uneven ground and without unduly affecting or changing the upwardly inclined pull on the plow which is desirable to maintain for keeping the plows in the ground to the proper plowing depth.

A further object of this invention is the provision of means between the frame and the draft medium and partially supported by the draft tongue with the forward end of the frame swinging in the same direction with the turning of the draft medium while the rear end of said frame will swing in a reverse direction to the front end of the frame and draft medium, so that the gangs of plows when travelling in the arc of a circle will maintain their correct relative relation that approximately the entire plowing width of all gangs of plows may be maintained on the turn without the plows of one gang cutting into the furrows made by the plows of the other gang or permitting the furrows made by the gangs of plows to be missed or unplowed.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a top plan view illustrating a draft equalizer attached to a draft medium and to gangs of plows and constructed in accordance with my invention.

Figure 2 is a side elevation illustrating the same.

Figure 3 is a top plan view illustrating the relative positions of the parts when the plows are plowing in the arc of a circle.

Figure 4 is a diagrammatical view illustrating the positions occupied by the frame when turning either to the right or left.

Figure 5 is a similar view illustrating the device adjusted to permit the employment of an increased number of plows to each gang.

Figure 6 is a diagrammatical view illustrating the training of the flexible elements over the sheaths carried by the tongue.

Referring in detail to the drawings, the numeral 1 indicates a substantially triangular shaped frame having formed integral with the apex 2 thereof a plow attaching beam 3 which is in parallelism with the right angle side 4 of the triangle. A diagonally extending brace 5 is secured to the triangular shaped frame 1 and extends from the hypotenuse side 6 to the corner 7 between the right angle sides 4 and 8 of the triangle for the purpose of forming a triangle within a triangle. The attachment of the brace 5 to the hypotenuse side 6 of the triangle is at a point intermediate the ends of the hypotenuse side and has secured thereto an attaching plate 9 provided with a plurality of transversely arranged apertures 10 any one of which is adapted to receive a pivot bolt 11 of a draft tongue 12. The normal position of the pivot pin 11 is in the aperture arranged in alignment with the longitudinal axis of the frame with the tongue extending forwardly of said frame and pivotally connected to a draft medium or tractor 13 by a suitable coupling 14. The draft tongue includes upper and lower plates 15 and 16 that receive therebetween the forward end of the frame or the short side 8 of the triangle. Spaced sheaths 17 and 18 are journalled between the upper and lower members 15 and 16 of the tongue 12 and located forwardly of the forward end of the frame. Flexible elements 19 are secured to the forward end of the frame 1 by suitable brackets arranged at opposite sides of the longitudinal axis of the frame and said flexible elements are trained over the sheaths 17 as shown in Figure 1 and then detachably secured to the ends of the arm 20 secured to the draft medium 13 and arranged transversely of said tongue. The arm 20 has its ends curved rearwardly relative to the draft medium 13 for positioning the flexible elements 19 so that they will not chafe or rub against the coupling 14 where they engage with the sheath 18.

Gang plows 21 are pivotally and yieldably attached to the plow beam 3 positioning said plows at one side of the longitudinal axis of the frame. Gang plows 22 are yieldably and pivotally secured to the frame 1 as shown at 23 and located forwardly of and at the opposite side of the longitudinal axis of the frame from the gang plows 21. The yieldable and pivotal connections between the gang plows and the frame are of such a construction that they will absorb shocks and are disposed in an upwardly inclined plane so that when the frame is moved forwardly by the draft medium 13 the plows will be maintained in the ground at a proper plowing depth.

Ground wheels 24 are pivotally secured to the frame 1 adjacent the attachments of the gangs of plows to the frame so that the ground wheels will support the frame at opposite sides of the longitudinal axis leaving the corner 7 of the frame unsupported so that the corner may move upwardly and downwardly with the movement of the draft medium when passing over uneven ground. The ground wheels located in the aforedescribed position provide pivot points on which the frame may tilt upwardly and downwardly at the corner 7.

The gangs of plows connected to the frame 1 in the foregoing manner position said plows at opposite sides of the longitudinal axis of the frame so that the ground acted upon by the plows will be from the longitudinal axis of the frame laterally in each direction. By this arrangement the plows will be properly spaced that all ground between the outermost plows of each gang will be plowed thereby obviating any possibility of any of the ground between the outermost plows of each gang being unplowed.

When plowing on a turn as shown in Figure 3 and due to the construction of the frame and its connection with the draft medium, the gangs of plows will maintain their relative position with the draft delivered to the gangs of plows evenly. The plows maintaining their relative positions as shown in Figure 3 will prevent the plows of one gang from cutting into the furrows made by the plows of the other gang. As shown in Figure 4 the various positions of the frames are indicated when turning to the right or left. Due to the connection of the flexible elements with the arm 20 and the forward end of the frame and trained over the sheaths causes the front end of the frame to swing in the same direction with the turning of the draft means causing the rear end of the frame to swing in an opposite direction thereby permitting the gangs of plows to maintain their relative position when plowing in the arc of a circle as shown in Figure 3. The gangs of plows due to the construction of the frame and its connection with the draft medium will be prevented from undue lateral shifting when plowing on a hillside, consequently obviating the plows in one gang from intercepting the furrows made by the plows of the other gang.

As shown in Figure 5 by shortening one of the flexible elements relative to the other flexible elements, it is possible to shift the angle of the frame relative to the draft medium so that an increased number of plows may be employed to each gang of plows without the danger of the plows of one gang cutting into the furrows made by the plows of the other gang.

A brace 25 may be employed between the side member 4 of the frame and the hypotenuse side 6 so as to cooperate with the brace 5 in efficiently bracing or strengthening the frame throughout its length.

The corners of the frame 1 are strengthened or reinforced by plates 26 and said plates form portions to which the axles of the ground wheels 24 may be journalled and also to which the plow coupling mediums may be attached.

From the foregoing description taken in connection with the accompanying drawings, it will be noted that during the operation of the device, the gang of plows will receive an equal amount of draft and that the plows will be maintained in their relative relation either when travelling in a straight course or turning in either direction, and further it will be noted that the pull upon the plows is in an upwardly inclined direction to maintain the plows at their proper plowing depth within the ground. When the plows are arranged in inoperative position or supported by their respective ground wheels, the device will cause the plows to track with the power medium thus permitting the device to be easily transported from one place to another. Further it will be noted that during plowing operation, should any one of the plows engage an obstruction or become clogged with foreign matter, the plows may be moved in a reverse direction by the power medium that plowing can be again easily and quickly restored.

While I have shown and described the preferred embodiment of my invention, it will be understood that minor changes in construction, combination and arrangement of parts may be made without departing from the spirit and scope of my invention, as claimed.

Having thus described my invention, what I claim is:

1. A draft equalizer comprising a frame, means for attaching gang plows to the frame at opposite sides of the longitudinal axis thereof, and a coupling means pivotally and adjustably secured to the frame rearwardly of the forward end thereof and capable of having itself pivotally arranged in alignment with the longitudinal axis of the frame or laterally of either side of the longitudinal axis and secured to a draft medium to deliver draft equally to the gang plows.

2. A draft equalizer comprising a substantially triangular shaped frame, ground wheels supporting the frame at a pair of corners thereof and arranged at opposite sides of the longitudinal axis of the frame and one wheel arranged in advance of the other wheel, means for securing gang plows to said corners at opposite sides of the longitudinal axis of said frame, and a coupling means pivoted to the frame rearwardly of the forward end thereof and having slidable connection with the forward end of the frame and secured to a draft medium for delivering draft to said frame in substantial alignment with the longitudinal axis thereof and evenly between the gangs of plows.

3. A draft equalizer comprising a substantially triangular shaped frame having the apex thereof disposed rearwardly, ground wheels pivoted to said frame at a pair of corners of said frame and arranged at opposite sides of the longitudinal axis of the frame and one wheel positioned in advance of the other wheel, means for movably securing gang plows to said corners of the frame and at opposite sides of the longitudinal axis of the latter for causing said plows to form furrows in the ground from the longitudinal axis of the frame laterally thereof in opposite directions, a draft tongue pivoted to said frame in alignment with the longitudinal axis thereof and rearwardly of the forward end of said frame and to a draft medium, and automatic means connected to the frame and to the draft medium for causing the forward end of the frame to swing in the same direction with the turning of the draft medium and the rear end of the frame to swing in an opposite direction for maintaining the gang plows in their relative relation when plowing on a turn.

4. A draft equalizer comprising a substantially triangular shaped frame having the apex thereof disposed rearwardly, ground wheels pivoted to said frame at a pair of corners of said frame and arranged at opposite sides of the longitudinal axis of the frame, means for movably securing gang plows to said corners of the frame and at opposite sides of the longitudinal axis of the latter a draft pivoted to said frame in alignment with the longitudinal axis thereof and to a draft medium spaced sheaths carried by the tongue flexible elements secured to the forward end of the frame at opposite sides of the longitudinal axis and trained over said sheaths and secured to the draft medium at opposite sides of the connection between the latter and the tongue for causing the forward end of the frame to swing in the same direction with the turning of the draft medium and the rear end of the frame to swing in an opposite direction for maintaining the gang plows in their relative relation when plowing on a turn.

5. In combination with a draft medium and gang plows a substantially triangular shaped frame positioned between the plows and the draft medium with the apex thereof disposed rearwardly, means movably securing the gang plows to the frame at opposite sides of the longitudinal axis thereof, ground wheels supporting said frame adjacent said means and arranged at opposite sides of the longitudinal axis of the frame, a draft tongue pivoted to the frame in alignment with the longitudinal axis thereof and to the draft medium, sheaths carried by the tongue, an arm secured to the draft medium and extending transversely of the tongue, flexible elements connected to the ends of the arms and to the forward end of the frame and at opposite sides of the longitudinal axis of the latter and trained over the sheaths to swing the forward end of the frame in the same direction with the turning of the draft medium and to cause the rear end of the frame to swing in an opposite direction for maintaining the gang plows in their relative relation when plowing on a turn.

6. In combination with a draft medium and gang plows, a substantially triangular shaped frame positioned between the plows and the draft medium with the apex thereof disposed rearwardly, means movably securing the gang plows to the frame at opposite sides of the longitudinal axis thereof, ground wheels supporting said frame adjacent said means and arranged at opposite sides of the longitudinal axis of the frame, a draft tongue pivoted to the frame in alignment with the longitudinal axis thereof and to the draft medium, sheaths carried by the tongue, an arm secured to the draft medium and having rearwardly curved ends disposed at opposite sides of the tongue, flexible elements connected to the ends of the arms and to the forward end of the frame and at opposite sides of the longitudinal axis of the latter and trained over the sheaths to swing the forward end of the frame in the same direction with the turning of the draft medium and to cause the rear end of the frame to swing in an opposite direction for maintaining the gang plows in their relative relation when plowing on a turn.

7. In combination with a draft medium and gang plows, a substantially triangular shaped frame arranged between the plows and draft medium and having the apex thereof disposed rearwardly, ground wheels pivoted to the frame at opposite sides of the longitudinal axis of the frame with one corner of said frame unsupported by a wheel, means for movably securing the gang plows to the frame at opposite sides of the longitudinal axis of the frame, a draft tongue pivoted to the frame rearwardly of the forward end thereof and in alignment with the longitudinal axis of said frame and pivoted to the draft medium, said tongue slidably supporting the forward end of the frame and permitting the unsupported corner of the frame to move upwardly and downwardly with the draft medium, an arm secured to the draft medium and extending transversely of the tongue, sheaths carried by the tongue, and flexible elements secured to the forward end and the frame at opposite sides of the longitudinal axis and to the ends of the arm and trained over opposite sides of the sheaths from their point of attachment to the frame and said arm.

8. A draft equalizer comprising a substantially triangular shaped frame including a hypotenuse side and right angularly disposed sides, a diagonally extending brace connected to the hypotenuse side intermediate the ends of the latter and to the corner formed by the right angularly disposed sides to form a second triangle within the first triangle, an attaching plate secured to the diagonal brace and the hypotenuse side of the first and second triangle, means attaching the plows to the frame at opposite sides of the longitudinal axis thereof, a draft tongue adjustably secured to the attaching plate and slidably supporting the short right angle side of the first triangle and pivoted to the draft medium, and means associated with the draft tongue and frame and draft medium to cause the forward end of the frame to swing in the same direction with the turn of the draft medium and the rear end of the frame to swing in an opposite direction for maintaining the plows in their relative relation when plowing on a turn.

9. In combination with a draft medium and gang plows, a substantially triangular shaped frame located between the plows and the draft medium, wheels supporting the frame at opposite sides of the longitudinal axis thereof, means securing the plows to the frame at opposite sides of the longitudinal axis of said frame, a draft tongue pivoted to the frame in alignment with the longitudinal axis thereof and to the draft medium, sheaths carried by said tongue, an arm secured to the draft medium and extending transversely of the tongue, flexible elements secured to the frame at opposite sides of the longitudinal axis and trained over the sheaths and detachably secured to the ends of the arm whereby either of said flexible elements may be varied as to length for adjusting the tongue relative to the forward end of the frame.

10. A draft equalizer comprising a triangular shaped frame having the apex thereof disposed rearwardly, ground wheels for supporting the frame at its apex and at the corner of the frame located at the opposite side of the longitudinal axis of said frame from the apex, means to secure gang plows to the apex and said corner of the frame, and a coupling means between the frame and a draft medium.

11. A draft equalizer comprising a triangular shaped frame having the apex thereof disposed rearwardly, ground wheels for supporting the frame at its apex and at the corner of the frame located at the opposite side of the longitudinal axis of said frame from the apex, means to secure gang plows to the apex and said corner of the frame, and a coupling means pivoted to the hypotenuse side of the frame and in substantial alignment with the longitudinal axis of said frame and to a draft medium.

12. A draft equalizer comprising a triangular shaped frame having the apex thereof disposed rearwardly, ground wheels for supporting the frame at its apex and at the corner of the frame located at the opposite side of the longitudinal axis of said frame from the apex, means to secure gang plows to the apex and said corner of the frame, and a coupling means pivoted to the hypotenuse side of the frame and in alignment with the longitudinal axis of the frame and slidably connected to the forward end of the frame and connected to a draft medium.

13. A draft equalizer comprising a triangular shaped frame having the apex thereof disposed rearwardly, ground wheels for supporting the frame at its apex and at the corner of the frame located at the opposite side of the longitudinal axis of said frame from the apex, means to secure plows to the apex and said corner of the frame, and a draft means pivoted to the hypotenuse side of the frame and intermediate the ends of said hypotenuse side and slidably engaging opposite faces of the forward end of the frame and secured to a draft medium.

14. A draft equalizer comprising a triangular shaped frame having the apex thereof disposed rearwardly, ground wheels supporting the frame at the apex and a corner of the frame located at the opposite side of the longitudinal axis of said frame from the apex leaving the opposite corner thereto free to move upwardly and downwardly, means for securing plows to the frame, and coupling means pivoted to the frame rearwardly of the forward end thereof and slidably secured to said last named end of the frame and to a draft medium.

In testimony whereof I affix my signature.

VOLANDO B. EAKIN.